United States Patent [19]
Patino et al.

[11] Patent Number: 5,576,610
[45] Date of Patent: Nov. 19, 1996

[54] METHOD AND APPARATUS FOR DETERMINING BATTERY CHARACTERISTICS

[75] Inventors: Joseph Patino, Pembroke Pines; Henry A. Bogut, Coral Springs; Jose M. Fernandez, Plantation, all of Fla.

[73] Assignee: Motorola, Inc., Schaumburg, Ill.

[21] Appl. No.: 270,618

[22] Filed: Jul. 5, 1994

[51] Int. Cl.[6] ......................... H01M 10/46; H01M 10/48
[52] U.S. Cl. .................................. 320/31; 429/90; 320/2
[58] Field of Search ........................... 320/31, 2; 429/90

[56] References Cited

U.S. PATENT DOCUMENTS

| | | | |
|---|---|---|---|
| 4,006,396 | 2/1977 | Bogut | 320/2 |
| 5,164,652 | 11/1992 | Johnson et al. | 320/2 |
| 5,200,686 | 4/1993 | Lee | 320/2 |
| 5,411,816 | 5/1995 | Patino | 320/2 |
| 5,460,901 | 10/1995 | Syrjälä | 429/90 |

*Primary Examiner*—Peter S. Wong
*Assistant Examiner*—Patrick B. Law
*Attorney, Agent, or Firm*—Scott M. Garrett

[57] ABSTRACT

A battery charging system (200) comprises a battery pack (206) and charger (202). Battery pack 206 includes a thermistor (212) for determining the temperature of battery pack (206) and a zener diode (210) in parallel with the thermistor (212) for informing charger (202) of the current capacity of battery (206) or of another battery parameter. Charger (202) includes a transistor (220) and zener diode (214) for effectively switching between measuring thermistor (212) and zener diode (210) at charger input terminal (224). This effectively reduces the number of battery and charger contacts required to measure two battery parameters as compared to the prior art.

5 Claims, 2 Drawing Sheets

METHOD AND APPARATUS FOR DETERMINING BATTERY CHARACTERISTICS

TECHNICAL FIELD

This invention relates generally to battery charging systems and more specifically to a method and apparatus for determining battery characteristics in a battery pack.

CROSS REFERENCE TO RELATED APPLICATIONS

This application is related to U.S. application Ser. No. 08/193773, filed Feb. 10, 1994, entitled "Method and Apparatus for Determining Battery Characteristics", by Joseph Patino, and assigned to Motorola, Inc.

BACKGROUND

It is very common for battery packs which are used in portable communication devices, such as two-way radios, to have a thermistor and a battery capacity resistor. The thermistor is used by a battery charger during the charging of the battery, to determine if the battery is being charged properly. While the capacity resistor is used by the charger to determine the capacity of the battery, prior to the battery being charged. The battery charger upon determining the battery capacity (e.g., 1000 milli-amp-hour maH, etc.) will select the proper charging rate to use, in order to optimally charge the battery pack.

Referring to FIG. 1, there is shown a prior art battery charging scheme consisting of a charger 102, radio battery pack 106 and radio 104. Radio 104 contains positive (B+) and negative (B−) battery terminals which are coupled to radio battery 106 via battery contacts 116 and 114, respectively. Battery 106 contains one or more battery cells 108, which determine the voltage and current capacity of battery 106. Also included as part of the battery 106, are protection diode 118, a battery temperature indicator such as thermistor (Rt) 112 and a battery capacity indicator, such as resistor (Rc) 110.

Charger 102 consists of a charger monitor circuit 128, which can consist of a well known microprocessor or microcontroller as known in the art and appropriate control software. Charger monitor circuit 128 controls charger control circuit 130 which provides current to battery 106 in order to charge the battery. A control signal is transmitted by charger monitor circuit 128 to charger control circuit 130 via bus 140, the control signal informs charger control circuit 130 on how much current to source via line 129 to battery 106.

Charger monitor circuit 128 contains three analog to digital (A/D) ports 120, 122 and 124. A/D port 120 monitors the voltage on the B+ line. A/D port 122 senses the resistance of capacity resistor Rc 110 and A/D port 124 in turn senses the resistance of thermistor Rt 112, as its resistance changes once the battery begins charging. A/D ports 122 and 124 include external pull-up resistors which are used to determine the resistance of Rc 110 and Rt 112, by determining the voltage level at A/D ports 122 and 124, respectively.

Charger 102 and battery 106 in the prior art scheme are required to have 4 lines connecting the charger 102 and battery 106. These lines being B+ line 132 which provides the charging current to the battery pack, Rc line 134 which is used to sense the capacity resistor 110, thermistor sense line 136 used to sense the resistance value of thermistor 112, and B− (ground) line 138.

The problem with the prior art battery charging and sensing scheme is that the charger requires 4 contacts and the battery requires 4 contacts in order for the battery and charger to mate with each other (lines 132–138) and perform all the required charging functions. Battery charger contacts tend to be expensive, given that they are usually finger contacts which are typically gold plated in order to provide good electrical connection to battery pack 106. The battery contacts also tend to be gold plated. A need thus exists for a method and apparatus that can accomplish the battery characterization functions (e.g., battery temperature and capacity determinations) performed by the prior art battery scheme, while reducing the number of battery contacts that are utilized to accomplish the required functions.

DETAILED DESCRIPTION OF THE PREFERRED EMBODIMENT

Figure 2:
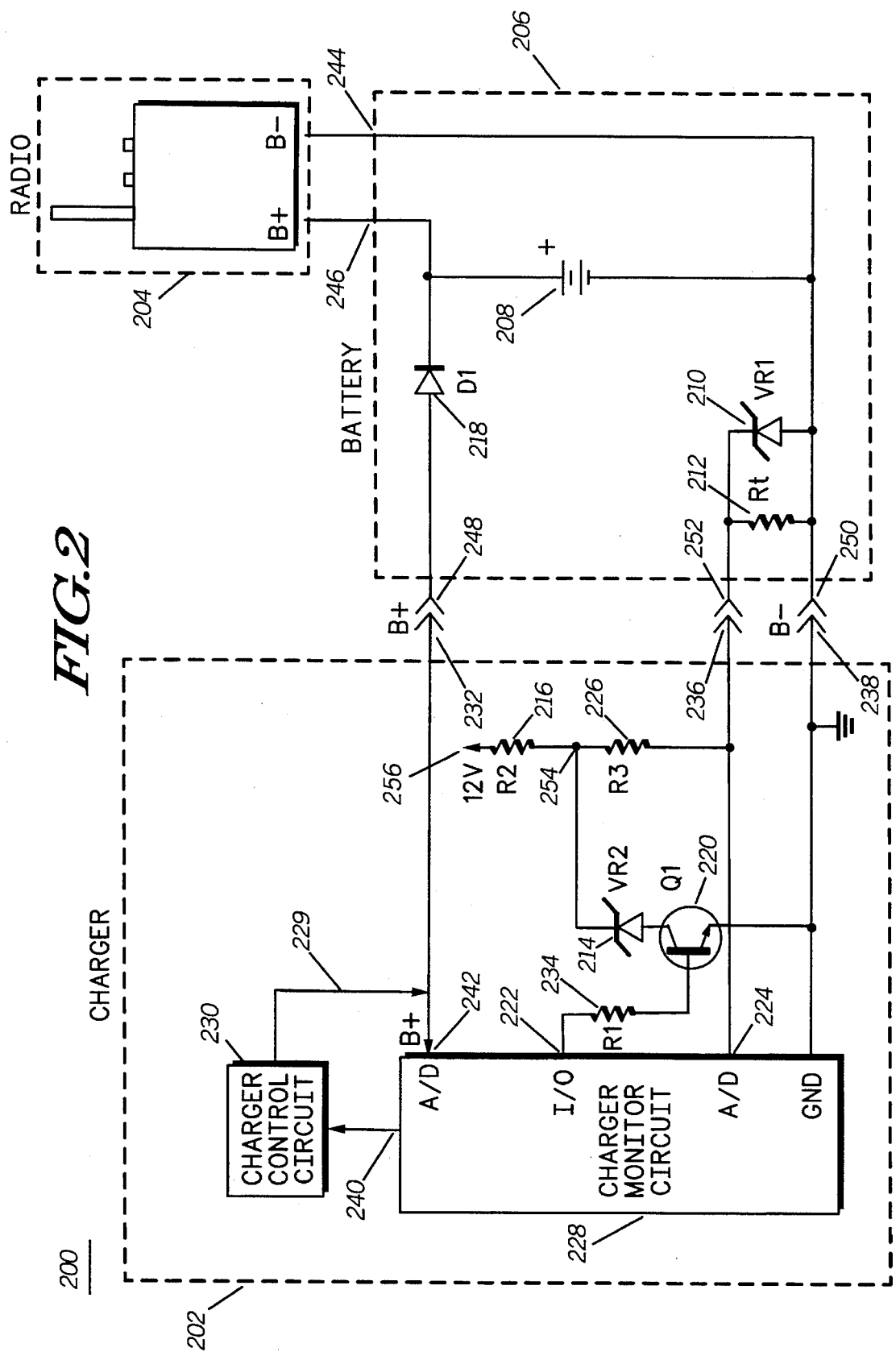
FIG. 2 is a battery charging system in accordance with the present invention.

Referring now to FIG. 2, there is shown a battery charging system 200 in accordance with the present invention. Charging system 200 comprises a battery charger 202, a battery pack such as radio battery pack 206, and a battery operated communication device such as radio 204. Radio 204 includes positive and negative (B+ and B−) terminals which are coupled to battery pack 206 via battery contacts 246 and 244.

Battery pack 206 comprises one or more battery cells 208 which determine the voltage and storage capacity for battery pack 206. For example, a radio battery can be designed, depending on the number of battery cells used, to have an operating voltage of 7.5 volts and a storage capacity of 1500 milli-amp-hours (maH) as an example. Battery pack 206 includes three battery charging contacts, first battery contact 248, second battery contact 252 and third battery contact 250. Battery contact 248 is the B+ (positive) terminal for battery 206, contact 250 is the B− or ground contact, and second battery contact 252 is the sensing contact.

Coupled between sensing contact 252 and ground contact 250 is a first battery characterization device such as thermistor (Rt) 212 which changes resistance as the temperature of battery 206 changes. The temperature of battery pack 206 typically increases as the battery cells 208 are being charged, with an abnormally high temperature indicating that the battery is being charged too rapidly. The thermistor 212 is also used to determine the completion of rapid charge cycles by determining the delta change in temperature over a given period of time.

Thermistor 212 thermally protects battery 206 during charging, by informing charger 202 of the approximate temperature of battery 206. Thermistor 212 also protects against external shorts across charging contacts 248 and 250. Also coupled between the B− battery contact 250 and sensing contact 252, is a second battery characterization device such as a zener diode (VR1) 210 which is connected in parallel to thermistor 212. Coupled between battery contact B+ 248 and the positive terminal of battery cells 208 is found a reverse current protection diode 218. Diode 218 protects battery cells 208 from being drained by battery charger 202.

Charger 202 comprises a charger monitor circuit or controller 228, which can be a well known microcontroller or microprocessor as known in the art. Charger 202 also includes a charger control circuit 230, which acts as a programmable current source which sources current to battery 206. Controller 228 informs charger control circuit 230 how much current to source to battery 206 via a control signal sent via bus 240. Once controller 228 sends the control signal to charger control circuit 230, charger control circuit 230 begins sending current via line 229 to the positive B+ battery contact 248 of battery 206. Controller 228 preferably can dynamically adjust the charging current provided by charger control circuit 230 to battery pack 206 by sending the charger control circuit 230 a new control signal 240.

Charger 202 further comprises a switching means which can take the form of a NPN transistor (Q1) 220, or other type of switching device. The base of transistor 220 is coupled to input/output port 222 of controller 228 via a first resistor 234. The emitter terminal of transistor 220 is coupled to ground potential, while the collector terminal is coupled to a zener diode 214 which is in turn coupled to a voltage source 256, in this case set at 12 volts, via a second resistor 216. A third resistor 226 is coupled between pull-up resistor 216 and the analog-to-digital port 224 of controller 228.

When battery 206 requires charging, battery 206 is mated with charger 202. Once mated together, battery charging contacts 248, 252 and 250 mate with charger terminals 232, 236 and 238 of charger 202, respectively. Terminals 232 and 236, are coupled to analog-to-digital (A/D) input terminals 242 and 224 respectively which are part of controller 228. Terminal 242 senses the voltage level of battery 206 during charging, while input terminal 224 determines the resistance of thermistor 21 2 by measuring the voltage present at input terminal 224 when transistor 220 is in a first state, or alternatively, the capacity of battery pack 206 by measuring the voltage present at input terminal 224 when transistor 220 is in a second state.

Operationally, when the capacity of battery pack 206 needs to be determined, switch 220 is switched to its first state or "off" condition. When transistor 220 is in the "off" condition, the 12 volt supply 256 is coupled to battery contact 252 via resistors 216 and 226. The A/D voltage at input port 224 therefore yields the result of the voltage latched by zener diode 210. Since the pull-up source voltage 256 is greater than the zener voltage of zener diode 210, zener diode 210 will turn on and latch the voltage level presented at input port 224 to the value of zener voltage of zener 210. In the preferred embodiment, the capacity of battery pack 206 is identified by the zener voltage of zener diode 210.

In order to determine the value of thermistor 212, switch (transistor Q1 ) 220 is switched to a second or "ON" condition by controller 228. In the "ON" condition, zener diode 214 is triggered since it's zener voltage is set in the preferred embodiment at 5 volts. Zener diode 214 therefore presents approximately 5 volts at node 254. Controller 228 then determines the resistance value of thermistor 212 by determining the voltage level present at input port 224. The voltage level presented at input port 224 is generated by the voltage divider developed by the resistance of thermistor 212 and resistor 226 to the voltage level generated by zener diode 214 (i.e., 5 volts) at node 254.

In the preferred embodiment, zener diode 214 provides a voltage of approximately 5 volts for pull-up resistor 226 at node 254, when transistor 220 is in the second state or "on" condition. Zener diode 210 located in battery pack 206 has a zener voltage greater then 5 volts and less than 12 volts in the preferred embodiment. Given that the voltage level at node 254 when determining the resistance of thermistor 212 is approximately 5 volts, and zener diode 210 has a zener voltage greater than 5 volts, zener diode 210 does not become activated when the controller 228 is determining the resistance of thermistor 212.

In the preferred embodiment, where pull-up supply voltage 256 is set at 12 volts, at least 8 different battery pack capacities can be identified by charger 202 using standard zener diodes. For example, by using zener diodes (zener 210) in different battery packs having the following diode trip voltages, 5.6 volt, 6.2 volt, 6.8 volt, 7.5 volt, 8.2 volt, 9.1 volt, 10.0 volt and 11.0 volt, eight different battery capacities can be determined by charger 202, thereby allowing for charger 202 to custom tailor its charging to the different battery sizes. Although preferably, zener diode 210 is used to determine the capacity of battery pack 206, it could be used to provide any other type of information about battery pack 206 to charger 202. The resolution of the A/D converter found in controller 228 at input port 224, will also determine the number of different zener voltages that can be identified.

By monitoring the voltage at input terminal 224 charger monitor circuit 228 can determine if battery pack 206 has been attached to charger 202. If no battery is coupled to charger 202, the voltage at input terminal 240 will approximate 12 volts, while if a battery is attached, the voltage at input terminal 240 will drop by the resistance divider created by resistors 216 and 226 in series and thermistor 212. By knowing when a battery pack is first inserted into charger 202, the charger 202 can commence the sequence of determining the value of zener diode 210 and thermistor 212.

Figure 1:
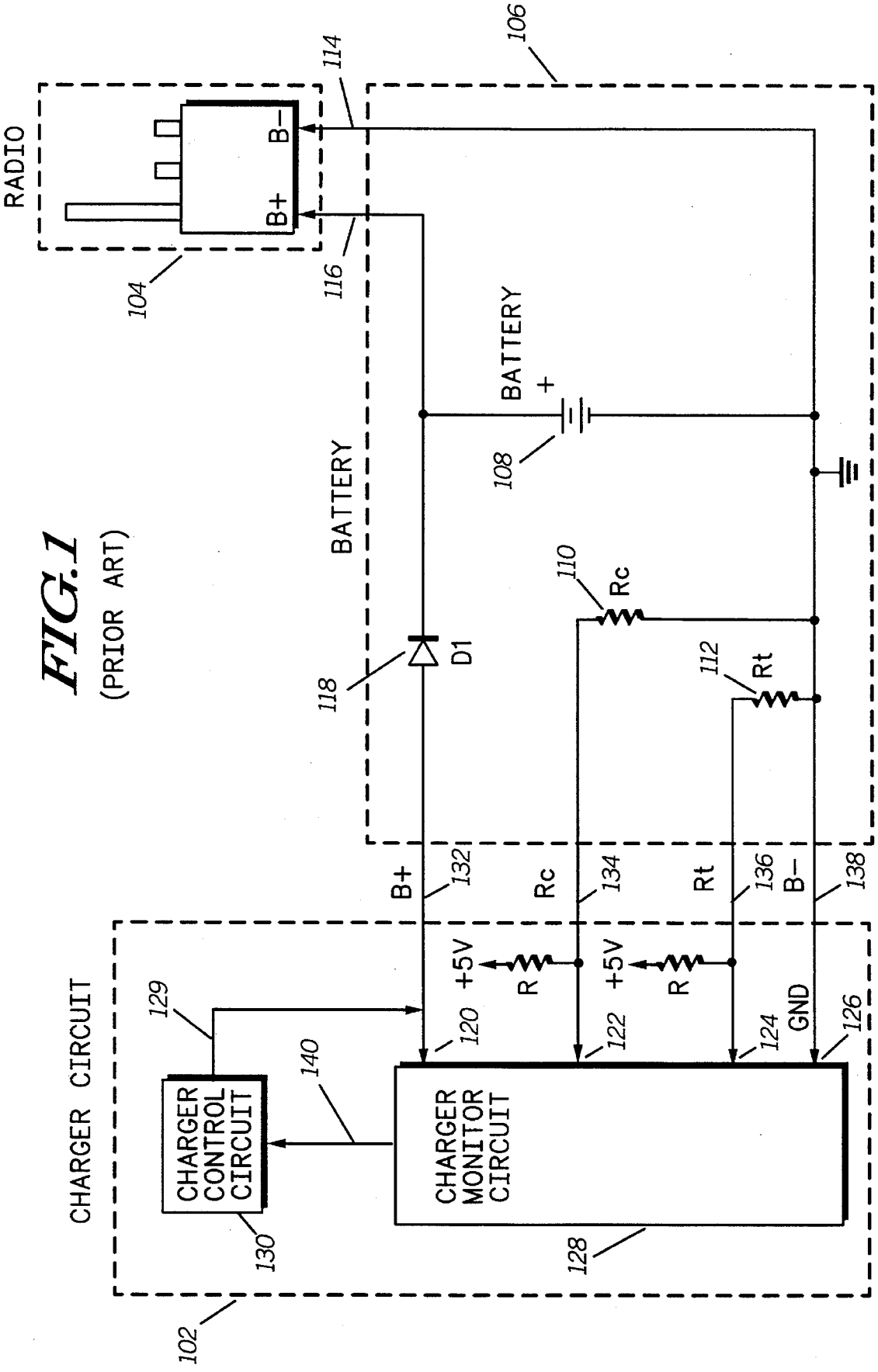
FIG. 1 is a schematic of a prior art battery charging system.

In summary, the present invention provides for a way of determining both the temperature and another characteristic of the battery pack 206, such as the battery pack capacity, using only one input terminal (terminal 236) at charger 202, instead of two as shown by the prior art design of FIG. 1. The present invention provides for a way of minimizing the number of battery contacts required, as well as reducing the number of contacts required at the battery charger.

What is claimed is:

1. A battery charger for charging a battery pack having first and second battery characterization devices coupled to a battery contact, the second characterization device comprising a zener diode having a zener voltage, the battery charger comprising:

a controller having an input terminal for coupling to the battery contact;

a switching device responsive to the controller for switching between first and second states, while in the first state, the switching device causes a first voltage level to become coupled to the battery contact in order for the controller to determine the value of the zener voltage at the controller input terminal, while in the second state, the switching device causes a second voltage level to become coupled to the battery contact in order for the controller to determine the value of the first battery characterization device at the controller input terminal, and wherein the first voltage level coupled to the battery contact is greater than the second voltage level.

2. A battery charger as defined in claim 1, wherein the switching device is a transistor.

3. A battery charger as defined in claim 1, wherein the controller is a microcomputer and the input terminal is an analog-to-digital (A/D) port which is part of the microcomputer.

4. A battery charger as defined in claim 1, wherein the first battery characterization device is a thermistor.

5. A battery charger as defined in claim 1, wherein the zener diode has a zener voltage and the zener diode causes a voltage level substantially equal to the zener voltage to be presented to the controller input terminal when the first voltage level is coupled to the battery contact.

* * * * *